United States Patent [19]
Smit et al.

[11] Patent Number: 4,702,323
[45] Date of Patent: Oct. 27, 1987

[54] RIDGE TILLAGE ATTACHMENT FOR PLANTERS

[75] Inventors: Edward H. Smit, Sheffield; Charles E. Sukup; Eugene G. Sukup, both of Dougherty, all of Iowa

[73] Assignee: Sukup Manufacturing Company, Sheffield, Iowa

[21] Appl. No.: 818,481

[22] Filed: Jan. 13, 1986

[51] Int. Cl.$^4$ ............... A01B 39/08; A01B 39/14
[52] U.S. Cl. ................ 172/156; 172/310; 172/624.5; 172/26; 172/705; 111/52
[58] Field of Search ............ 172/624.5, 776, 310, 172/156, 313, 140, 504, 705, 184, 187, 26, 159, 574, 575, 26; 111/52, 85, 63, 66, 59; 47/1.42

[56] References Cited

U.S. PATENT DOCUMENTS

| | | |
|---|---|---|
| 2,318,205 | 5/1943 | Drennan . |
| 2,644,387 | 7/1953 | Kamplade ............ 172/624.5 |
| 2,975,844 | 3/1961 | Oehler et al. . |
| 3,233,680 | 2/1966 | Arzoian et al. . |
| 3,362,361 | 1/1968 | Morrison, Jr. . |
| 3,433,307 | 3/1969 | Gilbert . |
| 3,450,074 | 6/1969 | Gatzke et al. . |
| 3,611,956 | 10/1971 | Moore et al. . |
| 3,749,035 | 7/1973 | Cayton et al. . |
| 3,845,730 | 11/1974 | Koronka et al. . |
| 4,004,640 | 1/1977 | Bland ..................... 111/52 |
| 4,054,007 | 10/1977 | Moore .................. 172/624.5 |
| 4,116,140 | 9/1978 | Anderson et al. . |
| 4,141,302 | 2/1979 | Morrison ................. 111/52 |
| 4,262,752 | 4/1981 | Parish . |
| 4,413,685 | 11/1983 | Gremelspacher et al. . |
| 4,520,876 | 6/1985 | Peterson ................ 172/538 |
| 4,553,607 | 11/1985 | Behn et al. . |

FOREIGN PATENT DOCUMENTS 598547  9/1925  France ................. 172/624.5

OTHER PUBLICATIONS

Article entitled "Ridging On 22-Inch Rows—Precision Row Guidance Makes This High Yield, Low Cost System Possible.

Operator's Manual for John Deere 7100 Folding Max-Emerge Planter, p. 73.
John Deere Fundamentals of Machine Operation—Planting (1975), pp. 21, 27, 106.
Portion of Parts Catalog for John Deere 7100 Folding Max-Emerge Integral Planter, dated Jan. 17, 1984.
Advertising Literature of Behn Ridge Systems, Inc. of Boone, Iowa and Madrid, Iowa entitled "Behn Ridge Systems, Inc. Offers Two New and Unique Items for John Deere and International Planters. (Maybe Others)."
Advertising Literature entitled "Behn Ridge Systems, Inc." of Behn Ridge Systems, Inc. of Boone and Madrid, Iowa.
Advertising Literature entitled "The Ridge Hugger" of K & M Manufacturing Company of Renville, Minn. Including a Reprint from the Dec., 1984 issue of *Farm Industry News*.

(List continued on next page.)

*Primary Examiner*—Richard J. Johnson
*Attorney, Agent, or Firm*—Neuman, Williams, Anderson & Olson

[57] ABSTRACT

A ridge tillage attachment for conventional row-crop planters for use in minimum tillage planting on row ridges is disclosed. This ridge tillage attachment includes a tool portion and a linkage portion. The linkage portion has a parallelogram linkage support system and is attached to the planter. The tool portion is detachable from the linkage portion and is in the form of a tool support beam with guide wheels, cutting discs and sweep plates mounted thereto. The linkage portion of the unit is designed so that it can remain attached to the planter after the tool portion has been detached. An adjustable compression spring down-pressure system acts directly above the tillage implements to apply maximum down pressure. The guide wheels can be adjusted relative to the tool support beam by a height adjustment structure located directly above the wheels. The cutter discs are slightly offset to prevent plugging between them and to facilitate penetration of the soil. The V-shaped sweep is formed by interchangeable reversible plates to increase the life of the plates.

30 Claims, 11 Drawing Figures

OTHER PUBLICATIONS

Article from *Progressive Farmer* of Sep., 1984 entitled "Farmer Designs Ridge Planting System".

Advertising Literature entitled "Ridge Tilling for Ridge Farmers" of BH Manufacturing, Inc. of Odin. Minn.

Advertising Literature entitled "Hiniker Econ-O-Till Cultivator" of Hiniker Company, Mankato, Minn.

Advertising Literature entitled "Hiniker Econ-O-Till 3500/3800" of Hiniker Company, Mankato, Minn.

Advertising Literature entitled "Buffalo Ridge Runner Till Plant Attachment" of Buffalo Farm Equipment, Fleisher Manufacturing, Columbus, Neb.

Advertising Literature entitled "Buffalo All-Flex Till Planter" of Buffalo Farm Equipment, Fleisher Manufacturing, Columbus, Neb.

Advertising Literature of Alloway, a Subsidiary of Rau of Fargo, N.D., Elk Grove, Calif., Caldwell, Id. of Harlan, Id.

Advertisement for Orthman Phase II Tracker Automatic Guidance Control System" of Orthman Manufacturing, Inc. of Lexington, Neb.

Advertising Literature entitled "Orthman Phase II Tracker Automatic Guidance Control System", Orthman Flex-Hiller and Orthman Double Disk Furrow Opener of Orthman Mfg., Inc., Lexington, Neb.

Advertising Literature entitled "Ridge-Til" of Kelderman Mfg., Inc. of Oskaloosa, Iowa.

Advertising Literature entitled "Trash Whipper Trash Cleaning System" of Acra-Plant Sales, Inc., Garden City, Kans.

Article entitled "Forget Foxtail—Ridge Planting Can Help Keep This Weed Out of Beans for Good" by Dick and Sharon Thompson, in the Jul./Aug. 1984 issue of the *New Farm*, pp. 18-20.

Article entitled "Reduced Till Planters" by Dave Mowitz in Feb. 1985 issue of *Successful Farming, Machinery Management* at pp. 19-25.

Article entitled "Making Ridge Tillage Work" by Donna Prevedell from Jul. 1984 issue of *Progressive Farmer* at pp. 34 and 36.

Article entitled "Ridge Till Saved Three Ton/Soil Acre" in the Sep. 1, 1984 issue of *Prairie Farmer*.

Article entitled "Ridges on the Contour Stop Erosion" from the Apr., 1986 issue of *Farm Journal*.

Article entitled "Ridge Tillage Soars in a Stagnant Economy" from Jan., 1986 issue of *Successful Farming*.

Article entitled "New John Deere 720" from Jan. 4, 1986 issue of *Iowa Farmer Today*.

Article entitled "New John Deere 720 Ridge Till Attachment" from the *Iowa Farm Bureau Spokesman* of Mar. 1, 1986.

Article entitled "Shaving the Top of the Ridges Beats No-Tilling Into Them" from the Mar., 1986 issue of *Successful Farming*.

Article entitled "Ridge Hugging Planter" by Bill Gergen in Dec. 1984 issue of FIN.

Article entitled "Build Your Own No-Till Drill" from Farm Show, vol. 7, No. 6, (1983).

Article entitled "Make Your Planter a Ridge Planter" by Bill Gergen from Feb. 1985 issue of FIN.

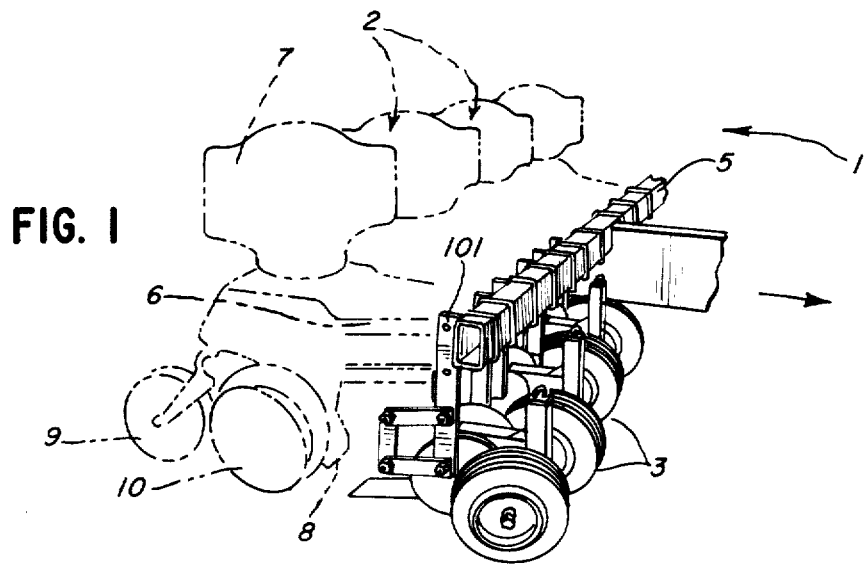
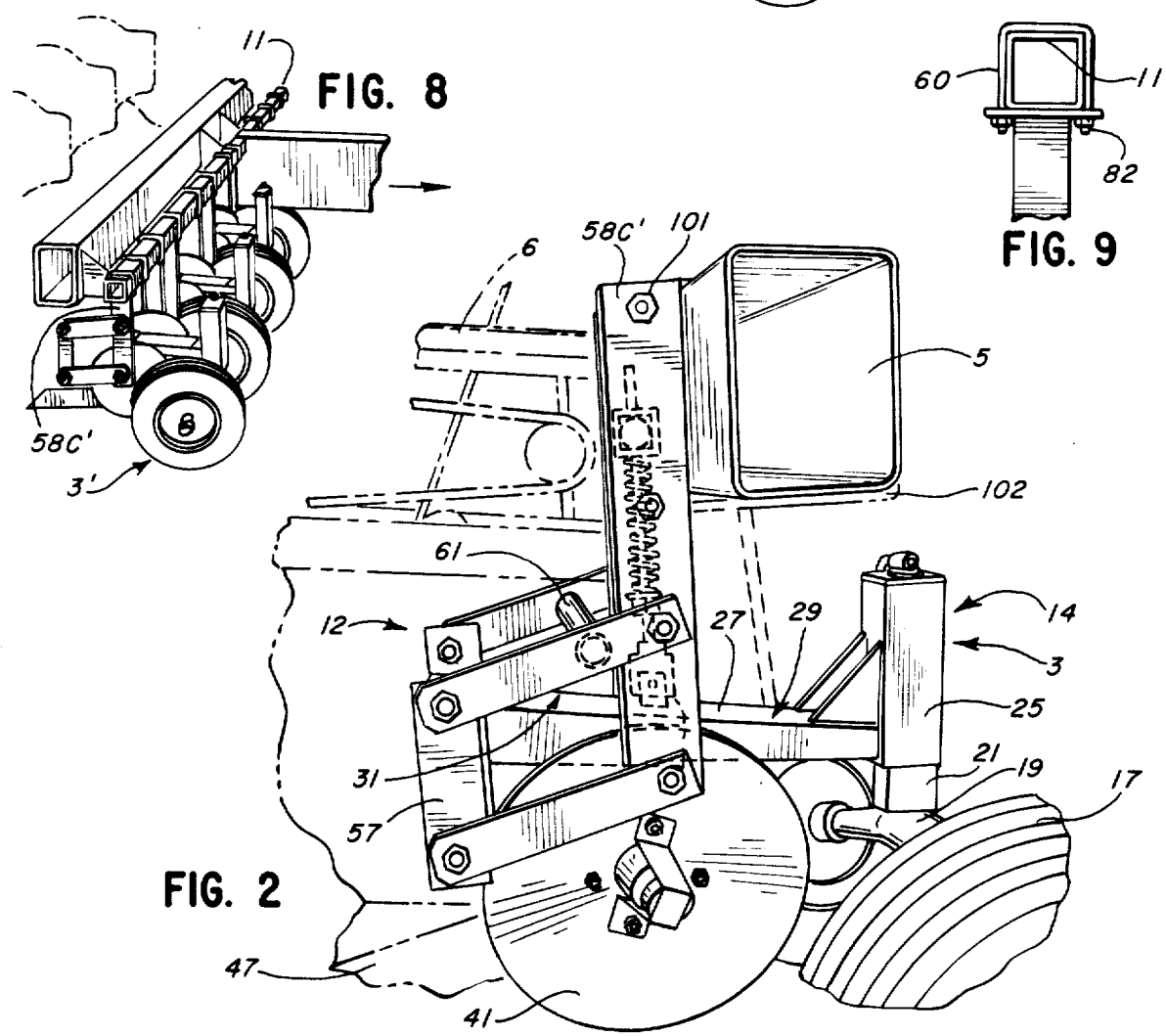
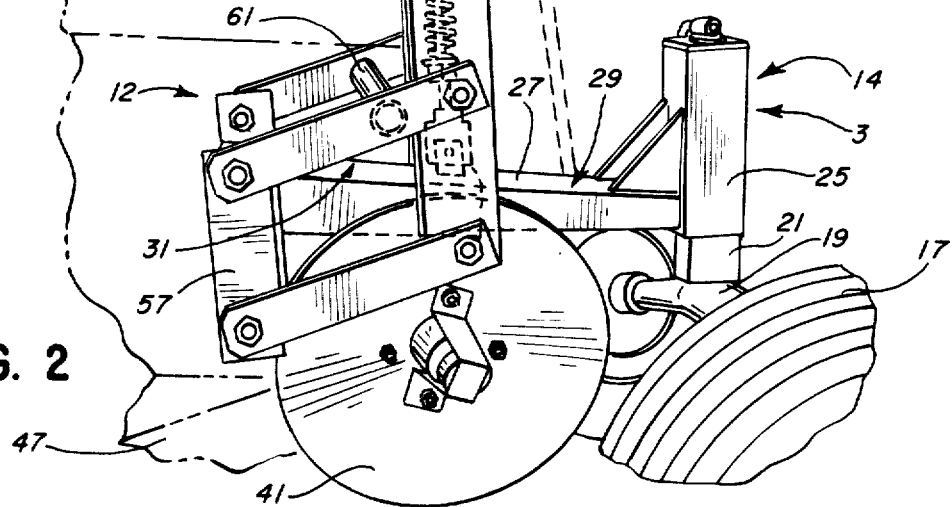

RIDGE TILLAGE ATTACHMENT FOR PLANTERS

BACKGROUND OF THE INVENTION

1. Field of the Invention

This invention relates to till planting apparatus for planting on ridges and in particular to an improved ridge tiller assembly for adapting conventional row-crop planters for use in minimum tillage planting on row ridges.

Minimum tillage ridge planting involves planting of a new crop in the crests of row ridges remaining from a previous crop, without prior preparatory tillage or prior removal of stover or other plant residue remaining from the preceding crop cycle. In recent years, the practice of minimum tillage ridge planting has become increasingly popular among farmers in growing various so called row-crops. Here, "row-crops" refers to corn, soybeans, and other crops which are grown in rows that are spaced apart a sufficient distance to permit tillage between the rows during plant growth.

It has been found that various crops can be grown more efficiently when planted on a ridge formed in conjunction with previous crops. Such ridges may be formed or at least reformed or enhanced during cultivation of the previous crop. The ridges resulting from such cultivation tend to warm and dry to desirable planting conditions earlier in the planting season than the remainder of the soil profile because the ridges are raised above the troughs between the ridges. Thus the ridges are drained better and are more exposed to the sun. Tillage is significantly reduced with this system, as compared to typical full tillage operations, with attendant savings in costs. Because there is no deep tillage to bring up dormant weed seeds, weed control is made easier.

Further, compaction of the seed bed is avoided, and leaving the crop residue on the surface helps reduce soil erosion.

While ridge tilling has become popular, typically it is not done in end rows where field equipment normally turns. In such places, conventional flat planting is practiced to maintain a more even terrain for easier crossing of the rows by the field equipment. Also, farmers may desire to plant some fields with traditional tillage and attendant flat field planting. As a result, planters should be convertible from having ridge planting capabilities to flat planting capabilities. In addition, where planters are too wide to move along roadways or through fence gates, they must have the ability to be folded, generally along the tool bar, so that such transport can be done conveniently. Ridge tillage attachments should not interfere with such foldability.

The components that have become available for adapting conventional planters to accommodate the ridges and troughs encountered and used in minimum tillage ridge planting are generally designed to be attached to a tool bar of conventional planters. One function of these ridge tools is to prepare the ridge for planting by clearing it of residue. Numerous tools can be attached to such tool bars, depending upon the desired end result.

Some of the commercially available systems used to prepare ridges for planting include a two-wheel attachment which straddles each ridge. A series of such units are attached to the tool bar of the planter and as a whole these units guide the planter along the ridges. Other ridge preparation attachments include cutting coulters sometimes in the form of a pair of discs that split through the residue or other material at the top of the ridge. Another attachment includes a sweep which acts as a scraper or plow to move away the debris and flatten the top of the ridge to form a cleared crest to prepare it for the formation of a furrow and seed implantation by the respective row planter unit. As uneven ground or rocks can be encountered, the attachments also need a system which will maintain a desired downward force or pressure to effect the intended tool operation while facilitating up and down movement of the apparatus to form a prepared surface. In many of the commercially available planters and attachments, this is accomplished by the use of a parallelogram linkage design which is part of the main planter to which the components are attached. Alternatively, a second parallelogram linkage system can be part of a unit with other components for ridge clearing. In any event, the design of the parallelogram linkage allows for up and down movement of the attachments to follow the ground level and to allow the attachments to ride up over rocks and other obstacles.

In commercially available systems for ridge preparation, tension springs are located across the linkages to bias the attachments downward. Coupled with the weight of the equipment, the attachments are forced into the ground so that the coulter can cut through the residue.

Some commercially available ridge planters include ridge tillage apparatus as well as seed planting means and soil covering apparatus such as packer wheels which follow the attachments used for ridge tillage.

It is desirable to have a ridge tillage unit which can be used to readily convert a planter from a conventional flat planter to a minimum-tillage ridge planter and vice versa. Such convertability is particularly needed for situations where ridge planting is not desirable, as at end rows. As discussed earlier, flat planting is usually done in such rows and a ridge attachment is needed that can allow flat planting to be done, in soft or hard soil, without the ridge planter assembly hampering the procedure. Another feature desired for a ridge tillage unit is to have wheels which guide both the tillage unit and the associated planter unit along a ridge. By guiding the units along a row, the units can be driven collectively along a series of ridges and the entire planter can operate atop the ridges. Another requirement for a ridge tillage unit is to have the ability to effectively penetrate, sever and clear away the residue at the peak of the ridge and to flatten the ridge so that a furrow can be formed and seeds planted at a predetermined depth. Another feature of a ridge planting attachment is to be designed to enable a planter, which is too wide to be transported along a road or through an opening, to be folded along its tool bar so that it can be narrowed in its conventional manner of operation.

It is an object of this invention to provide an improved ridge tillage attachment which meets the aforestated requirements and desirable characteristics.

It is another object of this invention to provide a detachable ridge tillage apparatus that can be removed easily from the remainder of the planter to convert it for flat planting or to enable the tool bar to be folded.

It is another object of this invention to provide a ridge tillage attachment with wheels that straddle a respective ridge and guide the entire planter.

It is another object of this invention to provide a ridge tillage attachment that can effectively cut through the residue on the ridge and clear it away so as to prepare the ridge for planting.

It is another object of the invention to provide ridge tillage attachments with an improved down-pressure arrangement.

Further and additional objects of this invention will appear from the following description, accompanying drawings and appended claims.

SUMMARY OF THE INVENTION

In accordance with one embodiment of this invention for use in ridge planting, the aforementioned requirements and objects are satisfied through a ridge tillage attachment that includes a tool portion and a linkage portion. The linkage portion, which includes a linkage beam portion, has a parallelogram linkage support system and is attached to the planter. The tool portion is removable from the linkage portion and is in the form of a tool support beam which is fit into the linkage beam portion at one end and has guide wheels, a cutter or disc opener and sweep blades mounted thereto. The linkage portion of the unit is designed so that it can remain attached to the planter after the tool portion has been detached. Because of the detachability of the tool portion from the linkage portion the planter can be readily converted from a ridge tiller/planter to a flat planter or the main planter tool bar can be folded to accommodate the planter in narrow spaces.

A compression spring down-pressure system acts directly above the tillage implements to apply maximum down pressure where it is needed most. The compression spring is adjustable to allow the downward pressure to be varied to accommodate varying soil types and moisture conditions. In a preferred embodiment, this spring system is mounted above the implements, to the end of the linkage beam portion where it overlaps the tool beam. In another embodiment, this spring system is mounted to the tool beam above the cutter.

The guide wheels can be adjusted relative to the tool beam by a height adjustment structure located directly above the wheels. In this way, the ridge tillage attachment can be adjusted as to height depending upon the particular ridge and soil conditions. The disc openers of the subject invention are slightly offset fore and aft relative to one another to prevent plugging between them and to facilitate penetration of the soil. The V-shaped sweep is formed from two pieces of steel so that the pieces can be interchanged when they wear, to increase the life of the plates.

DESCRIPTION OF THE DRAWINGS

For a more complete understanding of this invention reference should be made to the embodiment illustrated in greater detail in the accompanying drawings and described below by way of example of the invention.

FIG. 1 is a schematic partial side perspective view of a portion of a planter with ridge tiller assemblies attached to the planter at attachment points of the planter's parallelogram linkage system and embodying teachings of this invention;

FIG. 2 is a partial perspective side view of one ridge tiller assembly shown in FIG. 1;

FIG. 8 is a schematic partial side perspective view of a portion of a planter with ridge tillage assemblies attached to the planter in an alternative manner from FIG. 1;

FIG. 9 is a partial end view of FIG. 8;

Figure 3:
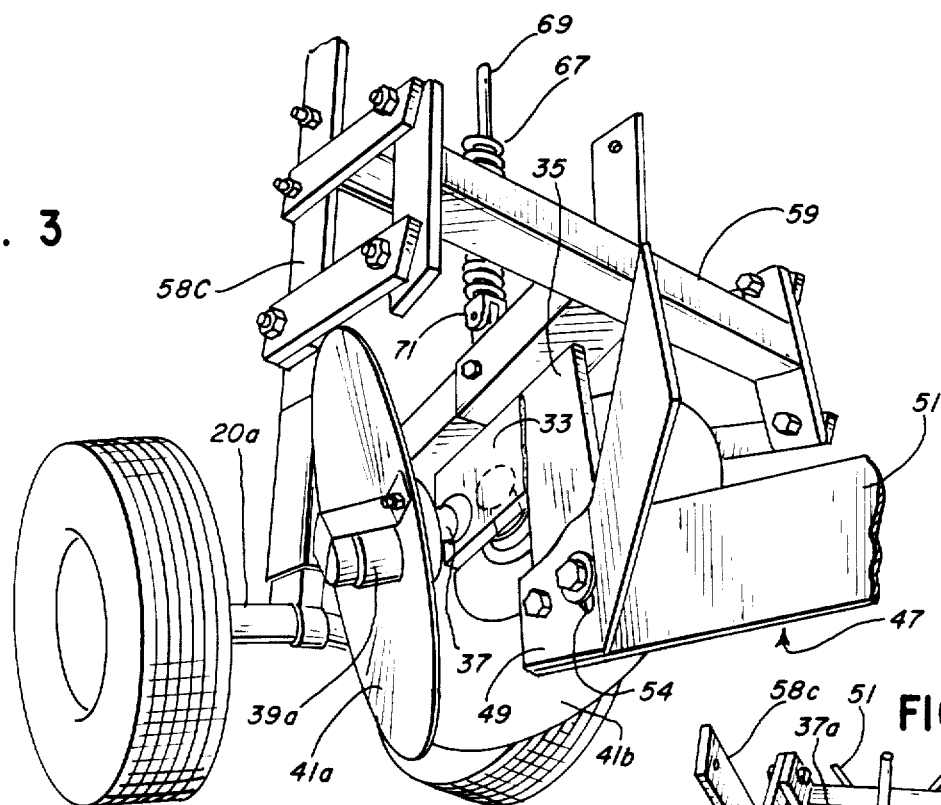
FIG. 3 is a bottom rear perspective view of the ridge tiller assembly shown in FIG. 1 not showing the transverse abutment bar.

It should be understood that the drawings are not necessarily to scale and thus the embodiment shown is sometimes illustrated in part by phantom lines and fragmentary views. In certain instances details of the actual structure which are not necessary for the understanding of the present invention may have been omitted. It should be understood, of course, that the invention is not necessarily limited to the particular embodiment illustrated herein.

DETAILED DESCRIPTION

FIG. 1 illustrates a portion of a conventional row-crop planter 1 adapted for minimum tillage ridge planting by the addition of several ridge tiller units or attachments 3 in accordance with this invention. The planter includes a planter tool bar 5 with a plurality of spaced-apart single row planting units 2, each attached to the bar 5 by a planter parallelogram linkage system 6. Each ridge tillage unit 3 is designed to straddle a ridge (not shown) and prepare the ridge for planting by severing the residue at the top of the ridge and scraping it away to form a cleared uniform crest for the respective planter unit. When a series of such units 3 are attached to the planter 1, the entire planter is guided along the ridges.

The portion of the planter 1 shown in FIG. 1 by phantom lines, including planting units 2 with the seed boxes 7, furrow openers 8, packing wheels 9 and gauge wheels 10, is shown to illustrate the relationship of the subject ridge tiller units or assemblies with the planter and is not a part of the subject invention. The ridge tiller asemblies 3 are designed as convenient add-on attachments to conventional planters and are detachable, as pointed out further below. It should be understood that a variety of other apparatus can be used with the planter, in addition to the subject ridge tiller assemblies 3, depending upon operations to be performed during planting. It should also be understood that the ridge tiller units 3 can be used with other configurations of planters not shown here.

Figure 5:
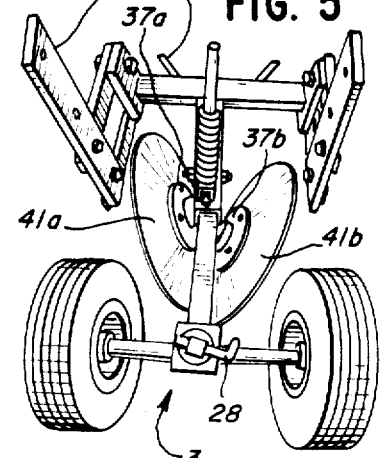
FIG. 5 is a top perspective view of the assembly of FIG. 3.
Figure 4:
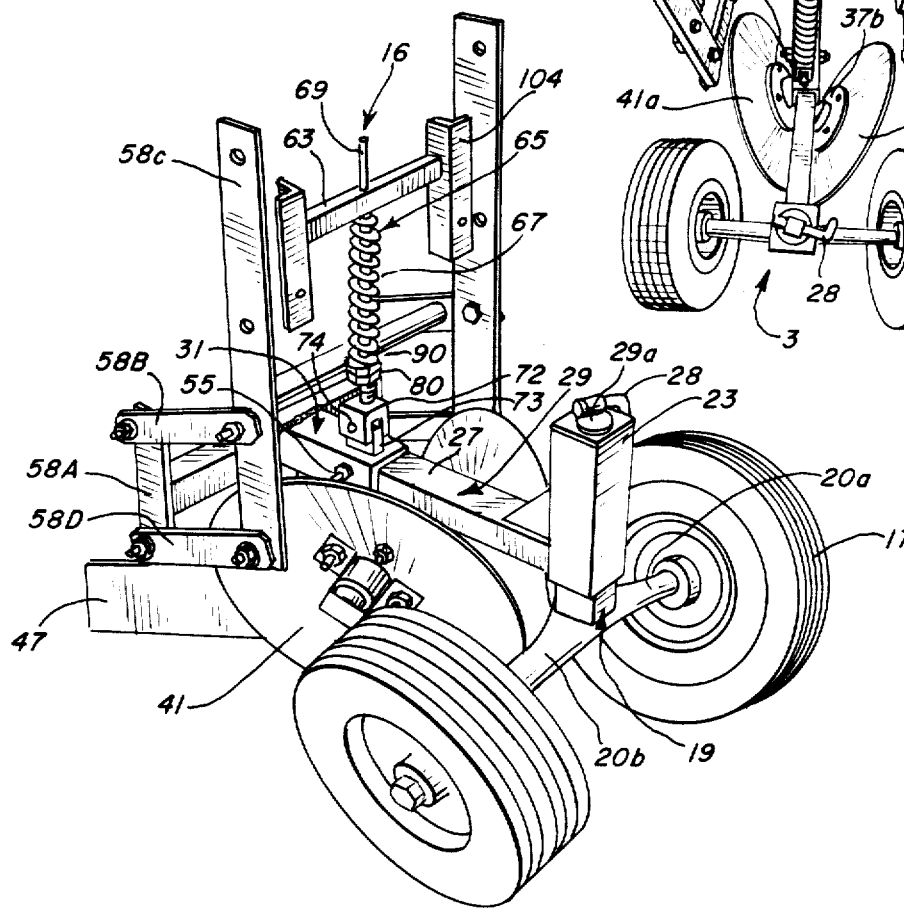
FIG. 4 is an upper front perspective view of the ridge tiller assembly shown in FIG. 1.
Figure 6:
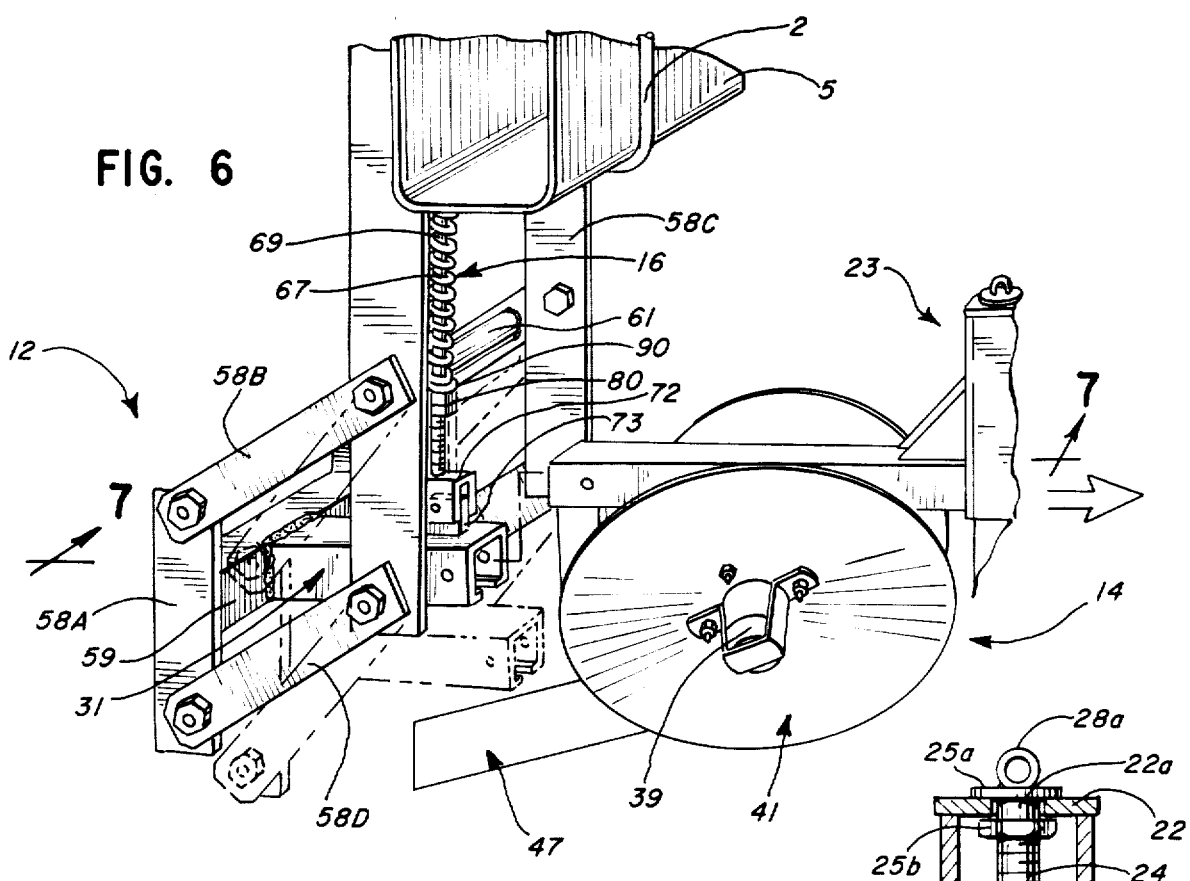
FIG. 6 is a side perspective view of the ridge tiller assembly shown in FIG. 1 with the tool portion being removed from the linkage portion, and with phantom lines showing the collapsed position of the linkage portion.
Figure 7:
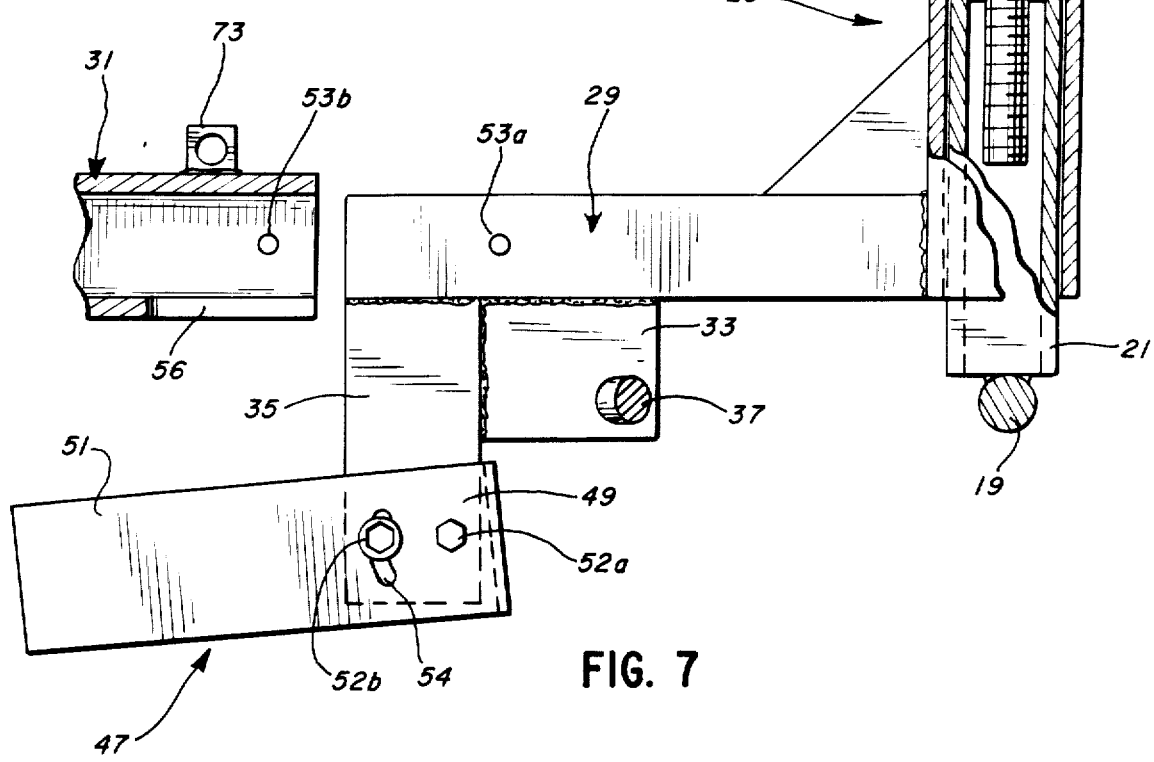
FIG. 7 is a partial section view taken generally along line 7—7 of FIG. 6, with the tool portion and linkage portion separated and also showing the sweep in side view.

FIG. 2 shows a ridge tiller assembly 3 attached to the planter 1 while FIGS. 3, 4 and 5 show the assembly apart from the planter. In FIGS. 3 and 5, the transverse abutment bar 63 and secondary angle irons 104 are not shown. Each assembly 3 includes a parallelogram support linkage system 12 for mounting and supporting the assembly on a planter, a tool unit 14 which is detachably supported on the linkage system, and a down-pressure link 16 acting over the tool unit. Each assembly 3 further includes a tool support beam 27 which comprises a tool portion 29 on which tillage implements 41 and 47 and guidance wheels 17 are mounted, and a linkage portion 31 which is affixed to the linkage 12. These beam portions are designed such that the tool portion 29 can be slid into the linkage portion 31, in a telescoping manner to detachably join these portions effectively into a single tool beam 27 which is cantilever mounted on the linkage 12. To this end, and as seen in FIGS. 4, 6 and 7, the linkage beam portion 31 is a short hollow stub box beam supported at one end on the linkage 12 and having the other end open. The tool beam portion 29 is a slightly smaller square beam which has a close telescopic fit in the open end of the stub portion 31.

Figure 11:
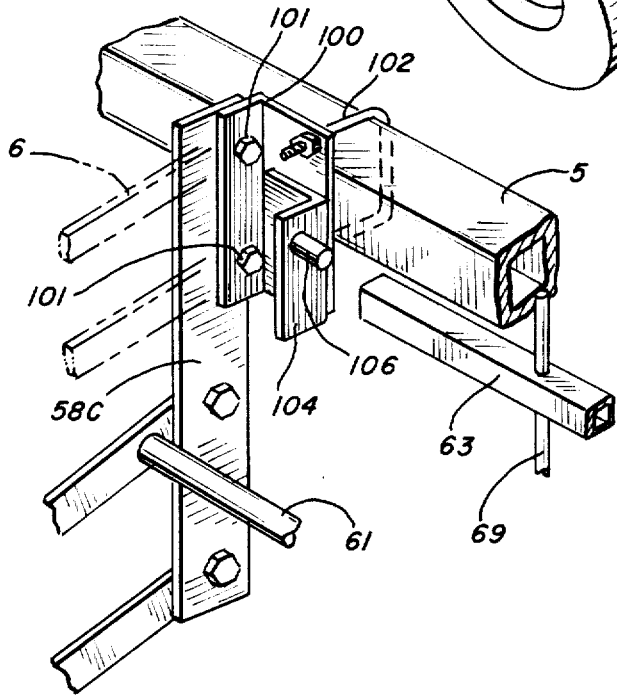
FIG. 11 is a partial view of one manner of attachment of the ridge tiller assembly to a planter, as in FIG. 1.

Each linkage support system 12 includes a pair of parallel spaced parallelogram linkages 58, each including a generally vertical forward mounting link or attachment strap 58C which is suitably attached at its upper end to the planter. In FIGS. 1 and 2, each attachment strap 58C of a unit 3 is shown mounted to the planter tool bar 5 at the fixed end pivot bolts 101 of the planter linkage 6 adjacent the planter tool bar 5. In particular and as shown in FIG. 11 mounting angle irons 100 of the planter linkage 6 typically are attached to the planter tool bar by U-bolts 102. The mounting bolts 101 are on the perpendicular flanges. Each attachment strap 58C is mounted on the bolts 101 outboard of the planter links such that the planter linkage is between the attachment strap 58C and the mounting angle iron 100. An alternate mode of attaching the ridge tiller units to the planter is shown in FIGS. 8 and 9. In this latter embodiment, each attachment strap 58C' of a tiller unit 3' is mounted with U-bolts to an auxiliary planter tool bar 11 which may be located forward of the main tool bar if the planter is of a design that will not accommodate the assemblies 3 on the main tool bar.

The tool unit 14 includes an adjustable wheel system 40 mounted to the front of the tool beam portion 29. This wheel system includes a vertically adjustable support assembly 23 and a pair of guide wheels 17. Each guide wheel is mounted to a fixed axle member 19 which is in turn welded or otherwise fixed to the inner casing 21 of the vertically adjustable support assembly 23. Each end portion 20a, 20b of the member 19 serves as an axle for one of the guide wheels 17. Each axle portion 20a, 20b is canted downward at a shallow angle relative to the longitudinal axis of the unit. Thus, each wheel 17 is mounted on the respective axle at an inward angle with the distance between them at their base, ground contacting portion, d1 less than the distance between the wheels at their top portion d2. This provides a tilted, downwardly converging arrangement of the wheels 17 for guiding engagement with the opposite sides of existing ridges. The axles also may be angled slightly to the rear so that the wheels have a slight forward toe out. As a result, the wheels are arranged so as to hug a ridge (not shown) straddled by the pair of wheels. Thereby, the wheels 17 of the series of row units guide the planter 1 along the rows of ridges in a manner to maintain the cutting and clearing tools of the row units on the ridge crests. In instances where there is not sufficient clearance between the ridges for there to be two guide wheels 17 therebetween, alternate sets of the wheels can be removed and replaced by single rollers. This can be effected by removing the inner casing 21 of the respective support assemblies 23 with the respective wheels of alternate units 14, and replacing each such removed casing with a casing carrying a steel roller which supports the remainder of the detachable unit above the ground.

The vertically adjustable support assembly 23 is used to adjust the height of the ridge tillage implements relative to the wheels and thus relative to the ridge, and is shown in section in FIG. 7. This vertically adjustable assembly 23 includes an outer casing 25 which is mounted to the beam 29, as by welding, and telescopically receives the inner casing 21. A threaded rod 24 extends through an opening 22a in a top cap 22 which is affixed to the outer casing 25 as by welding. Thrust elements 25a and 25b, such as washers or nuts, are affixed to the rod 24 at each side of the cap 22 whereby the rod is freely rotatable in the cap but thrust forces on the rod will be transmitted to the cap and thus to the outer casing 25. The rod threadably engages a nut 26 which is affixed to the inward end of inner casing 21, as by welding. An L-shaped crank 28 (shown in FIG. 4) is fit through an eyelet 28a at the top of the threaded rod 24 to facilitate turning of the rod. Such turning of the rod telescopes the inner casing 21 in and out and thereby extends and retracts the guide wheels 17 to vertically adjust the wheels 17 relative to the tillage implements 41 and 47 for adjusting the height setting of the ridge tiller assembly 3 relative to the ridge.

As shown in FIGS. 3 and 7, mounted to the bottom of the tool portion 29, as by welding thereto, are two rectangular plates, namely a disc mounting plate 33 and a sweep mounting plate 35. These plates are abutted and welded together to form an inverted "L" configuration, with the sweep mounting plate 35 extending below that of the disc mounting plate 33. These plates, together with the tool beam portion 29 and outer casing 25 effectively form the frame for the tool unit 14.

Welded to each side of the disc mounting plate 33 are disc axles 37 for rotatably mounting the center bearing assemblies 39 of cutting discs or rolling coulters 41 which are designed to cut through any debris along the center of the ridge. In particular, each coulter is dished and is mounted such that the pair of coulters 41 converge forward and downward in the manner of furrow openers. As shown in FIGS. 3 and 5, one disc axle 37a is offset ahead of the other axle 37b. As a result, these cutting discs 41 are slightly offset so that a first cutting disc 41a leads a second cutting disc 41b. These cutting discs 41a, 41b each have sharpened edges about their circumference to cut through residue on the top of the ridge. The slightly offset manner of assembly and the inward mounting of these discs such that they tend to converge enhances this cutting action so that residue and soil on the ridge can be readily penetrated. The slightly offset manner of configuration also prevents the plugging of residue between the discs. The discs spread the residue and subjacent soil to open a shallow furrow along the crest of the ridge.

Also mounted to the tool portion 29 via the sweep holding plate 35 are a pair of interchangeable reversible sweep blades 47 which form a V-shaped configuration and function to clear away the soil and debris which has been initially cut and spread by the discs 41. In particular, a pair of holes are provided through the bottom portion of the sweep mounting plate 35. Mounted on opposite sides thereof are the two sweep blades or bent plates 47, each with a leading end affixing portion 49 which is generally parallel to and abutted with one side of the sweep plate, and a sweep portion 51 which extends rearwardly and outwardly therefrom. The leading edges are closely adjacent one another, as seen in FIG. 3 to follow in the opening created by the discs 41. This avoids accumulation of debris on the sweeps and plugging of the unit. Mounting bolts 52a and 52b through portions 49 and plate 35 secure the blades to the plate 35. As best seen in FIG. 7, the rearward bolt opening 54 through each blade is elongated to allow selective adjustment of the vertical angular orientation of the blades before tightening the bolts. By adjusting the sweep blades to have the forward end slightly upward, as shown best in FIG. 7, a crown can be formed on the top of the ridge to prevent water from setting on the ridge. The front and bottom portions of the sweep blades 47 contact the ground and act as a plow to move away the debris which has been cut by the disc and to form a smooth cleared crest so that a furrow can be formed and seed planted in a clean strip of soil by the respective following planter unit. Because of the constant contact with the soil and residue by each sweep along its bottom portion, these bottom portions show significant wear in comparison to the top portion. The design of these sweep blades 47 is such that after the bottom portion of each has worn, they can be interchanged and reversed such that the bottom portion of a first blade becomes the top portion of the second blade respectively and vice versa. That is, the two blades are of identical design and symmetrical about their center longitudinal axes.

The linkage beam portion 31 has a slot 56 in its bottom at the outer end to accommodate the sweep holding plate 33 and disc holding portion plate 35 when the beam portions 29 and 31 are joined. The entire tool unit 14 is designed to be fitted with the support linkage 12 so that the two beam channels 29 and 31 can be telescopically joined and held together by fastening means 55 through overlapping holes 53a and 53b to form the tool support beam, bar or spine 27. Additional fastening means can be provided for rigidity.

As noted above, each support linkage 12 comprises two parallelogram linkage units 58. Each of these parallel linkage units 58 has four links, 58A–58D which are pivotally attached to each other to provide for up and down movement of the respective ridge tillage tool units 14. The parallel pivot links 58B and 58D extend rearwardly from the fixed vertical support link 58C, i.e., in a direction away from the wheels 17. Each end of a transverse linkage channel 59 is welded to the vertically movable or floating back link 58A of one of the parallel linkage units 58. Each back link 58A is substantially parallel to the respective forward mounting link or attachment strap 58C. The linkage beam portion 31 is attached to the center of the transverse linkage channel 59, as by welding its inner end thereto.

A stop bar 61 joins the top pivot links 58B of each linkage unit 12. The stop 61 abuts against the forward mounting link 58C of each parallel linkage unit when the linkage unit 58 is collapsed (shown by phantom lines in FIG. 6). The stop bar 61 provides additional transverse support to the ridge linkage system 12 and acts as a stop means for the linkage when the tool unit 14 is detached from the planter or when the entire ridge tillage assembly 3 is lifted off of the ground (as when the planter is turning or being transported). The mounting links 58C extend above the parallel linkage units and the entire ridge tiller assembly. As discussed earlier, at its top the mounting link 58C is fastened to the tool bar 5 of the planter 1 as shown best in FIG. 11 or to an auxiliary tool bar 11 as shown in FIG. 8. The attachment to the auxilliary tool bar 11 is shown in greater detail in FIG. 9 and includes a T-bar plate 82 and a U-bolt 60 over the auxiliary bar 11. Other modes of attachment may be utilized as appropriate to a particular planter.

Figure 10:
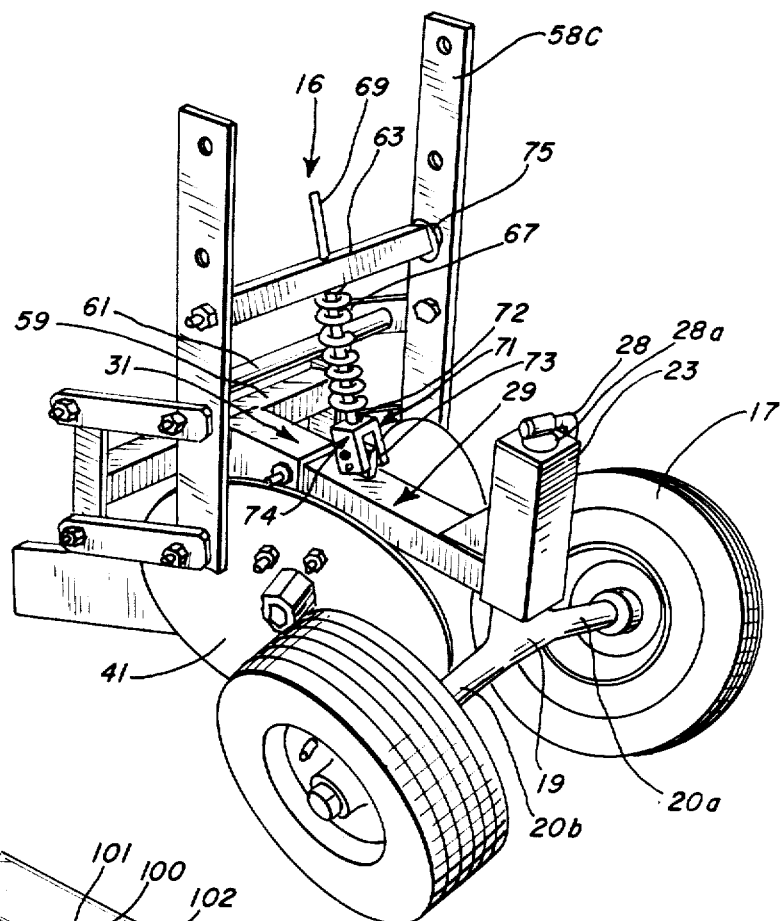
FIG. 10 is an upper front perspective view of the ridge tiller assembly of the invention where the compression spring down-pressure system is mounted to the tool beam.

The down-pressure link 16 is a compression spring assembly 65 as illustrated in FIGS. 2-6 for a preferred embodiment and in FIG. 10 for another embodiment. In both embodiments, the bottom end of the spring assembly is located on the top of the tool support beam over the center line of the tool unit 14 and directly above the tillage implements to force the implements into the ground. This assembly includes a transverse abutment bar or top bar 63 extending between the two mounting links 58C, above the top links 58B of the parallel linkage units, preferably at about the height of the planter tool bar 5. In a preferred embodiment and as shown best in FIG. 11, this transverse abutment bar can be rotatable about short rod studs 106 which are welded to the secondary angle irons 104 which are smaller than the mounting angle irons 100. Each secondary angle iron 104 is mounted opposingly to the mounting angle iron and parallel to the planter tool bar 5 to form a U-shaped type configuration. Alternatively, this transverse bar can be affixed to the planter tool bar 5 such that it is not rotatable. This can be accomplished, for example, by affixing tabs on opposite ends of the transverse bar and mounting them to the mounting angle irons at the U-bolts. The compression spring assembly 65 further includes a compression spring 67 which surrounds a threaded rod 69. This rod passes freely through a hole in the center of the top bar 63. Where the transverse bar 63 is fixed, this hole should be oversized to allow for angular movement of the rod. This rod is affixed at its lower end to pivoting means 71 mounted in a preferred embodiment to the top of the linkage beam portion 31. Mounting the rod 69 vertically, parallel to the vertical surface of the tool bar 5, permits the rod 69 to extend upward beside the tool bar. This permits use of a long rod and spring since the transverse bar 63, through which the rod passes, as shown in FIG. 2, can be mounted beside the planter tool bar 5. This extended length of the rod allows for greater adjustability of the compression spring. Alternatively, as shown in FIG. 10, the lower end of the rod can be mounted to the top of the tool beam portion 29, but this is less desirable as it places the pressure link 16 at an angle and also requires detachment of the down-pressure link 16 when the tool unit 14 is being detached from the parallelogram support linkage system 12. With either embodiment, however, the down-pressure link acts directly above the tillage implements.

The downward pressure of the spring 67 can be adjusted by a pair of adjustable abutment nuts 80 threaded on the rod at the bottom of the spring 67 and above the pivoting means 71. A bearing washer 90 can be used between the nuts and the spring. The illustrated pivot means 71 is a clevis 72 on the rod 69, a stud 73 on the linkage beam 31 (or the tool beam 29 in FIG. 10) and a pivot pin 74. FIG. 10 also shows an alternate manner of facilitating the rotation of the transverse bar 63 where it is rotatable on studs 75 which are mounted on links 58C.

This ability of the transverse bar 63 to rotate and the free movement of the rod 69 therethrough facilitates the up and down movement of the tillage unit 14 as it moves over the ground. This ability to rotate also allows the threaded rod 69 to be readily removed from the bar when the rod is attached to pivoting means located on the tool portion beam 29 as shown in FIG. 10.

The ridge tiller of this invention is designed so that the tool portion with the tools readily can be removed from the support linkage by removing the fastening means 55 and sliding the tool beam 29 out of engagement with the linkage. FIG. 6 shows the tool unit 14 being removed from the parallel linkage support 12 which remains attached to planter tool bar 5. The support linkage 12 and the down-pressure link 16 remain attached to the planter. The phantom lines show the linkage system in the collapsed state which it may then assume, with the stop bar 61 resting against the mounting links 58C. The unit shown in FIG. 10 can also be readily detached by sliding both the tool beam 29 and rod 69 out of engagement with the linkage.

Thus, with this invention a planter which has been adapted for ridge tillage planting by the addition of ridge tiller units can be used for flat planting by just removing the tool units 14. When ridge planting is to be resumed, the planter again can be converted to a ridge tillage planter by fitting the tool units into the linkage portions. This convertability is also advantageous in planters where the tool units would interfere with folding or otherwise preparing the planter for transport purposes. With this invention, the entire ridge tillage assemblies need not be removed to accommodate such folding or conversion. Rather, just the tool units need to be detached.

In operation, the compression spring assembly of each ridge tillage unit applies the force directly onto the tool support beam, over the tillage implements, for maximum benefit so that the implements can cut and clear the top of the ridge. The guide wheels keep the entire planter aligned with the ridges, and their ability to be adjusted further provides convenient adaptation to different operating conditions. The placement of the clearing attachments and guide wheels onto one detachable assembly also makes storage easier since the assembly can be detached, transported and stored as a unit.

Thus, improved ridge tillage equipment has been provided which meets the aforestated objects of this invention.

While a specific embodiment of the invention has been shown, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate those features of this invention within the true spirit and scope of the following claims.

What is claimed is:

1. A planter having a plurality of row-planter units and a plurality of ridge tillage units for clearing said ridges for planting thereon by said planter units, each ridge tillage unit comprising
   a linkage system;
   a tool portion attached to said linkage system, including a longitudinally extending tool beam having mounted thereon a support assembly including ground-engaging wheel means and ridge clearing means for clearing said ridge of debris, said tool beam including a first tool beam portion affixed to said linkage system and a second tool beam portion on which said support assembly and said ridge clearing means are mounted, said second tool beam portion being detachably mounted on said first tool beam portion;
   said linkage system including support means above said tool beam and pivot links for accommodating upward and downward movement of said tool beam relative to said support means; and
   pressure means confined between said support means and said tool beam above said ridge clearing means for applying down pressure to said tool portion.

2. A planter as in claim 1 wherein the number of row-planter units is equal to the number of said ridge tillage units and one ridge tillage unit is mounted to said planter in row alignment with each row-planter unit.

3. A planter as in claim 1 also having an auxiliary tool bar and wherein said linkage system includes pairs of forward and rearward links, relative to the direction of travel of said planter, such that each ridge tillage unit is mounted at its forward links to said auxiliary tool bar.

4. A planter as in claim 1 wherein said pressure means is attached to and acts on said tool beam.

5. The planter as in claim 1 wherein said support assembly includes ridge engaging guide wheel means.

6. A ridge tillage unit for attachment to farming equipment comprising:
   a mounting section having a mounting part for mounting said ridge tillage unit to said farming equipment;
   a linkage portion attached to said mounting section;
   a tool portion attached to said linkage portion, said tool portion including a longitudinally extending tool beam having mounted thereon a support assembly including ground-engaging wheel means and ridge clearing means, said tool beam including a first tool beam portion affixed to said linkage and a second tool beam portion on which said support assembly and said ridge clearing means are mounted, said second tool beam portion being detachably mounted on said first tool beam portion;
   said linkage portion including support means above said tool beam and pivot links for accommodating upward and downward movement of said tool beam relative to said support means; and
   pressure means confined between said support means and said tool beam above said ridge clearing means for applying down pressure to said tool portion.

7. A ridge tillage unit as in claim 6 wherein said pressure means is attached to and acts on said tool beam.

8. A ridge tillage unit as in claim 6 wherein said pressure means is attached to and acts on said first tool beam portion.

9. A ridge tillage unit as in claim 6 wherein said linkage portioin includes a transverse abutment bar and said pressure means includes a compression spring with a rod fit therethrough, said rod having two ends wherein one end is attached to said second tool beam portion and a second end is removably mounted to said transverse abutment bar such that said pressure means and said tool portion are detachable as a unit from said linkage portion.

10. A ridge tillage unit as in claim 9 wherein said transverse abutment bar is rotatable to facilitate detachment of said pressure means from said linkage portion.

11. A ridge tillage unit as in claim 6 wherein said ridge clearing means includes two dish-shaped cutting discs mounted to said tool beam such that they are angled forwardly and downwardly and are offset relative to one another in the direction of movement of said unit.

12. The ridge tillage unit as in claim 6 wherein said support assembly includes ridge engaging guide wheel means.

13. A ridge tillage unit adapted to be attached to a row-crop planter, comprising a linkage portion including means for mounting said unit on a planter, a detachable tool portion including a support assembly including ground-engaging wheel means and means for clearing debris from said ridge, said linkage portion and said tool portion including cooperative means for removably mounting said tool portion on said linkage portion, said cooperative means comprising a first tool beam portion attached to said linkage portion and a second tool beam portion of said tool portion detachably fixed to said first tool beam portion whereby said tool portion may be attached to and detached from said linkage portion by attaching and detaching said tool beam portions while said linkage portion is attached to such a planter, said first and second tool beam portions defining a longitudinally extending tool beam, said linkage portion including a transverse support having two ends, a pair of parallelogram linkage units With a front link and pivot links, each parallelogram linkage unit mounted to opposite ends of said transverse support such that the parallelogram linkage units are substantially parallel, and a stop bar mounted on said pivot links and adjacent said front link such that said stop bar contacts said front link to limit the drop in said pair of linkage units when said tool portion is removed from said linkage portion or said tillage unit is raised from the ground by raising said front links.

14. A ridge tillage unit adapted to be mounted to a row-crop planter and comprising a tool portion with a support assembly including ground-engaging wheel means and means for clearing ridges of debris, and a linkage portion for accommodating upward and downward movement of said ridge tillage unit, said linkage portion including means for attaching said linkage portion to a planter and a first tool beam portion, and said tool portion including a second tool beam portion on which said support assembly, wheel means and clearing means are mounted, said first and second tool beam portions defining a longitudinally extending tool beam, and means for detachably mounting said second tool beam portion on said first tool beam portion whereby said tool portion may be attached to and detached from said linkage portion while said linkage portion is attached to such a planter.

15. A ridge tillage unit as in claim 14 wherein said tool portion includes said second tool beam portion and guide wheels and ridge tillage implements mounted thereon and said first tool beam portion includes a channel designed to slidably engage said second tool beam portion.

16. A ridge tillage unit as in claim 14 wherein said linkage portion includes pivot linkage and a support means, said support means locates above said first tool beam portion and said pivot links, said tillage unit also having pressure means confined between said support means and said first tool beam portion above said cutting and clearing means for applying down pressure to said tool portion.

17. The invention of claim 14 wherein said unit includes means for applying down pressure on said tool portion.

18. A ridge tillage unit adasptied to be attached to a row-crop planter, including a tool beam with ridge tillage implements mounted thereon and adjustable guide means for guiding said ridge tillage unit along a ridge, said adjustable guide means comprising a pair of guide wheel and height adjustment means for adjusting the height of the ridge tillage implements relative to said wheels, said height adjustment means including a first vertical support element mounted on said tool beam, a second vertical support element in vertical sliding telescopic engagment with said first vertical support element, said wheels being mounted on a lower portion of said second vertical support element, a threaded rod having threaded engagement with one of said first and said second vertical support elements and rotatably supported in the other of said vertical support elements, and means for selectively rotating said rod for effecting relative vertical adjustment of said first and said second vertical support elements and thereby adjusting the height of the tool beam and tillage implements thereon relative to said wheels.

19. A ridge tillage unit as in claim 18 wherein said first vertical support element is a hollow casing having a top portion with a first hole therethrough and an open bottom portion, and said second vertical support element has an upper threaded portion and a lower portion with said wheels mounted thereto, said threaded rod extended through said first hole, and a pair of thrust elements attached to said rod on opposite sides of said top portion for abutment engagement with opposite sides of said top portion, said rod engaging said threaded portion such that said rod can be turned to telelscope the second support element in and out of said hollow casing and thereby retract and extend said guide wheels to vertically adjust said tillage implements relative to said wheels.

20. A ridge tillage unit as in claim 18 wherein said first vertical support element is a hollow casing having a top portion and an open bottom portion, and said second vertical support element has an upper portion and a lower portion with said wheels mounted thereto, whereby rotation of said rod telescopes the second support element in and out of said hollow casing and thereby retracts and extends said guide wheels to vertically adjust said tillage implements relative to said wheels.

21. A ridge tillage unit as in claim 18 wherein said first vertical support element is a hollow casing having a top portion and an open bottom portion, and said second vertical support element has an upper portion and a lower portion with said wheels mounted thereto, said threaded rod being in said threaded and rotatable engagement with said top portion and said upper portion, whereby rotation of said rod telescopes the second support element in and out of said hollow casing and thereby retracts and extends said guide wheels to vertically adjust said tillage implements relative to said wheels.

22. A planter having a plurality of row-planter units and a plurality of detachable ridge tillage units for guiding said planter along ridges and clearing said ridges for planting thereon by said planter units, each ridge tillage unit comprising
a linkage system;
a tool portion attached to said linkage system, including a longitudinally extending tool beam having mounted thereon a ridge engaging guide means for guiding said attachment along a ridge a ridge clearing means for clearing said ridge of debris, said tool beam including a first tool beam portion affixed to said linkage and a second tool beam portion on which said guide means and said ridge clearing means are mounted, said second tool beam portion being detachably mounted on said first tool beam portion; and pressure means mounted to said linkage system for applying down pressure to said tool portion.

23. The invention of claim 22 wherein said pressure means acts substantially directly above said ridge clearing means.

24. A ridge tillage unit for attachment to farming equipment comprising:
- a mounting section having a mounting part for mounting said ridge tillage unit to said farming equipment;
- a linkage portion attached to said mounting section;
- a tool portion attached to said linkage system, said tool portion including a longitudinally extending tool beam having mounted thereon ridge engaging guide means and ridge cutting and clearing means, said tool beam including a first tool beam portion affixed to said linkage and a second tool beam portion on which said guide means and said ridge clearing means are mounted, said second tool beam portion being detachably mounted on said first tool beam portion; and
- pressure means cooperating with said linkage system and acting substantially directly above said ridge cutting and clearing means for applying down pressure to said tool portion.

25. A ridge tillage unit for attachment to farming equipment comprising:
- a mounting section having a mounting part for mounting said ridge tillage unit to said farming equipment;
- a linkage portion attached to said mounting section;
- a tool portion attached to said linkage portion, said tool portion including a tool beam having mounted thereon a support assembly including a ground-engaging wheel means and ridge clearing means, wherein said tool portion and said linkage portion have mating portions designed for slidably and detachably mating the tool portion and linkage portion, one of said mating portions having a dimension slightly less than a corresponding dimension of the other of said mating portions such that the tool portion can be slidably mounted to said linkage portion;
- said linkage portion including support means above said tool beam and pivot links for accommodating upward and downward movement of said tool beam relative to said support means; and
- pressure means for applying down pressure to said tool portion.

26. A ridge tillage unit for attachment to farming equipment comprising:
- a mounting section having a mounting part for mounting said ridge tillage unit to said farming equipment;
- a linkage portion attached to said mounting section;
- a tool portion attached to said linkage portion, said tool portion including a tool beam having mounted thereon a support assembly including ground-engaging wheel means and ridge clearing means;
- said linkage portion including a support means comprising a transverse abutment bar above said tool beam and pivot links for accommodating upward and downward movement of said tool beam relative to said support means; and
- pressure means confined between said support means and said tool beam above said ridge clearing means for applying down pressure to said tool portion and including a compression spring with a rod fit therethrough, said rod having two ends wherein one end is attached to said tool beam and a second end is movably mounted to said transverse abutment bar and said compression spring is disposed between said tool beam and said transverse abutment bar for applying down pressure to said tool beam.

27. A ridge tillage unit as in claim 26 wherein said tool beam includes a first tool beam portion affixed to said linkage and a second tool beam portion on which said support assembly and said ridge clearing means are mounted, said second tool beam portion being detachably mounted on said first tool beam portion, and said rod being attached to said first tool beam portion for applying down/pressure thereto.

28. A ridge tillage unit as in claim 26 wherein said transverse abutment bar is rotatable.

29. A ridge tillage unit as in claim 26 wherein said rod has affixed to its adjustment means for adjusting the down pressure of said compression spring.

30. A ridge tillage unit for attachment to farming equipment comprising:
- a mounting section having a mounting part for mounting said ridge tillage unit to said farming equipment;
- a linkage portion attached to said mounting section;
- a tool portion attached to said linkage portion, said tool portion including a tool beam having mounted thereon a support assembly including ground-engaging wheel means and ridge clearing means, said clearing means including cutting means mounted to the bottom side of said tool beam;
- said linkage portion including support means above said tool beam and pivot links for accommodating upward and downward movement of said tool beam relative to said support means; and
- pressure means confined between said support means and said tool beam above said ridge clearing means for applying down pressure to said tool portion, said pressure means being adjustable for varying down pressure on said ridge clearing means, said support means including a transverse abutment bar, and said pressure means including a rod pivotally mounted at one end to said tool beam substantially directly above said cutting means and removably mounted at its other end to said transverse abutment bar, a compression spring on said rod between said tool beam and said transverse abutment bar, and spring adjustment means attached to said rod between said compression spring and said tool beam for altering the pessure applied to said clearing means.

* * * * *

UNITED STATES PATENT AND TRADEMARK OFFICE
CERTIFICATE OF CORRECTION

PATENT NO. : 4,702,323

DATED : October 27, 1987     Page 1 of 2

INVENTOR(S) : Edward H. Smit et al

It is certified that error appears in the above-identified patent and that said Letters Patent is hereby corrected as shown below:

In The Cover Page, under References Cited:

The following references should be added:

4,126,190 11/78 Wiley
4,461,355 7/84 Peterson
4,577,568 3/86 Netsch

In The Cover Page, under Other Publications:

In the citation of the first article, after "Possible", add --" by Bill Gergen in September 1985 issue of FIN.--.

Column 1, line 6, delete "1" before "Field of Invention".

Column 5, line 48, "gui.de" should read --guide--.

Column 10, line 51 "portioin" should read --portion--.

Column 11, line 22, "With" should read --with--.

Column 11, line 56, "linkage" should read --links--.

Column 11, line 57, "locates" should read --located--.

Column 11, line 66, "adaspted" should read --adapted--.

UNITED STATES PATENT AND TRADEMARK OFFICE
CERTIFICATE OF CORRECTION

PATENT NO. : 4,702,323
DATED : October 27, 1987
INVENTOR(S) : Edward H. Smit et al It is certified that error appears in the above-identified patent and that said Letters Patent is hereby corrected as shown below:

Column 12, line 8, "engagment" should read --engagement--.

Column 12, line 25, "extended" should read --extending--.

Column 12, line 30, "telelscope" should read --telescope--.

Column 12, line 65, "a" should read --and-- (second occurrence).

Column 13, line 39, delete "a".

Column 14, line 3, delete "a".

Column 14, line 25 "down/pressure" should read --down pressure--.

Column 14, line 29, "its" should read --it--.

Column 14, line 61, "pessure" should read --pressure--.

Signed and Sealed this

Twenty-first Day of June, 1988

*Attest:*

DONALD J. QUIGG

*Attesting Officer*  *Commissioner of Patents and Trademarks*